(12) United States Patent
Sirotkin (10) Patent No.: US 9,390,600 B1
(45) Date of Patent: Jul. 12, 2016

(54) REMOTE POWER STATE DETECTOR (71) Applicant: Mikhail Leonidovich Sirotkin, Chagrin Falls, OH (US)

(72) Inventor: Mikhail Leonidovich Sirotkin, Chagrin Falls, OH (US)

( * ) Notice: Subject to any disclaimer, the term of this patent is extended or adjusted under 35 U.S.C. 154(b) by 0 days.

(21) Appl. No.: 14/982,125

(22) Filed: Dec. 29, 2015

Related U.S. Application Data (63) Continuation-in-part of application No. 14/051,669, filed on Oct. 11, 2013, now abandoned.

(51) Int. Cl.
*G08B 21/00* (2006.01)
*G08B 7/06* (2006.01)
*H04W 4/20* (2009.01)

(52) U.S. Cl.
CPC .. *G08B 7/06* (2013.01); *H04W 4/20* (2013.01)

(58) Field of Classification Search
CPC .................................. G08B 21/18; G08B 13/08
USPC ........... 340/654, 680, 539.1, 545.1, 506, 541, 340/569, 635, 638
See application file for complete search history.

(56) References Cited

U.S. PATENT DOCUMENTS

| 5,608,378 | A | 3/1997 | McLean | |
|---|---|---|---|---|
| 6,336,825 | B1 | 1/2002 | Seefried | |
| 6,733,146 | B1 * | 5/2004 | Vastano | G05G 1/105 362/23.02 |
| 7,121,707 | B2 | 10/2006 | Currie | |
| 2006/0202848 | A1 | 9/2006 | Volodarsky | |
| 2012/0169454 | A1 * | 7/2012 | Petersen | G08B 1/08 340/4.1 |

* cited by examiner

*Primary Examiner* — Tai T Nguyen
(74) *Attorney, Agent, or Firm* — Kyle A. Fletcher, Esq.

(57) ABSTRACT

The power state monitor addresses the risks described above. The power state monitor monitors the power status of one or more appliances and alerts the user when the power status of the appliance may not be what the user desires. The power state monitor comprises a one or more sensors and a centralized alarm device. Each sensor is attached to a selected appliance to monitor the power consumption of the selected appliance. Each sensor communicates with the centralized alarm device. When a sensor detects power consumption from its assigned appliance, the sensor transmits this power status to the centralized alarm device. The centralized alarm device monitors the status of the one or more appliances and, when certain thresholds are reached, generates an alarm to the user. In addition, the centralized alarm device can be configured to activate a relay that disconnects the appliance from the electrical power source.

20 Claims, 6 Drawing Sheets

FIG. 6

REMOTE POWER STATE DETECTOR

CROSS REFERENCES TO RELATED APPLICATIONS

This non-provisional application claims priority to United States non-provisional application U.S. Ser. No. 14/051,669 filed on Oct. 11, 2013. The condition of the parent application is pending at the time of this filing, and will eventually go abandoned.

STATEMENT REGARDING FEDERALLY SPONSORED RESEARCH

Not Applicable

REFERENCE TO APPENDIX

Not Applicable

BACKGROUND OF THE INVENTION

The present invention relates to the field of power consumption management and safety devices, more specifically, a device that monitors the powered state of appliances.

Leaving appliances energized can result in inadvertent waste of electricity, as well as fire and other safety hazards. For example, any appliance with a heating element, such as an iron, grill, hot plate, or space heater can cause substantial damage if left on in unsafe conditions. One of the most common ways fires start in residential homes is when the occupant forgets to turn off the home appliances and leaves the building or goes to bed with the potential result of property damage or personal injury.

SUMMARY OF INVENTION

The power state monitor addresses the risks described above. The power state monitor monitors the power status of one or more appliances and alerts the user when the power status of the appliance may not be what the user would wish. The power state monitor comprises a one or more sensors and a centralized alarm device. Each sensor selected from the one or more sensors is attached to an appliance selected from the one or more appliances to monitor the power consumption of the selected appliance. Each of the one or more sensors detects the power status of its selected appliance by monitoring the status of the power indication light of the appliance. Each of the one or more sensors communicates with the centralized alarm device. When a sensor selected from the one or more sensors detects power consumption from its assigned appliance, the sensor transmits this power status of the appliance to the centralized alarm device. The centralized alarm device monitors the status of the one or more appliances and, when certain thresholds are reached, generates an alarm to the user using a visual signal, an audible signal, some form of electronic messaging, or a combination of these methods. In an alternate embodiment of the disclosure, the centralized alarm device can activate a relay that disconnects the appliance from the electrical grid.

These together with additional objects, features and advantages of the power state monitor will be readily apparent to those of ordinary skill in the art upon reading the following detailed description of the presently preferred, but nonetheless illustrative, embodiments when taken in conjunction with the accompanying drawings.

In this respect, before explaining the current embodiments of the power state monitor in detail, it is to be understood that the power state monitor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the power state monitor.

It is therefore important that the claims be regarded as including such equivalent construction insofar as they do not depart from the spirit and scope of the power state monitor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The power state monitor 100 (hereinafter invention) comprises one or more sensors 101 and a centralized alarm device 102.

The one or more sensors 101 comprise individual sensors 105. Each of the individual sensors 105 selected from the one or more sensors 101 is a device that is adapted to monitor the power indication light 152 of an appliance 151. The power indication light 152 of the appliance 151 is a light, generally an LED that is illuminated when the appliance 151 is powered on and that is not illuminated when the appliance 151 is not powered. As most clearly shown in FIG. 2, each individual sensor 105 selected from the one or more sensors 101 comprises a first logic module 111, a first communication module 112, a first power module 113, and an optical sensor 114. The optical sensor 114 is a photoelectric device that detects the light generated by the power indication light 152 of the appliance 151.

Figure 1:
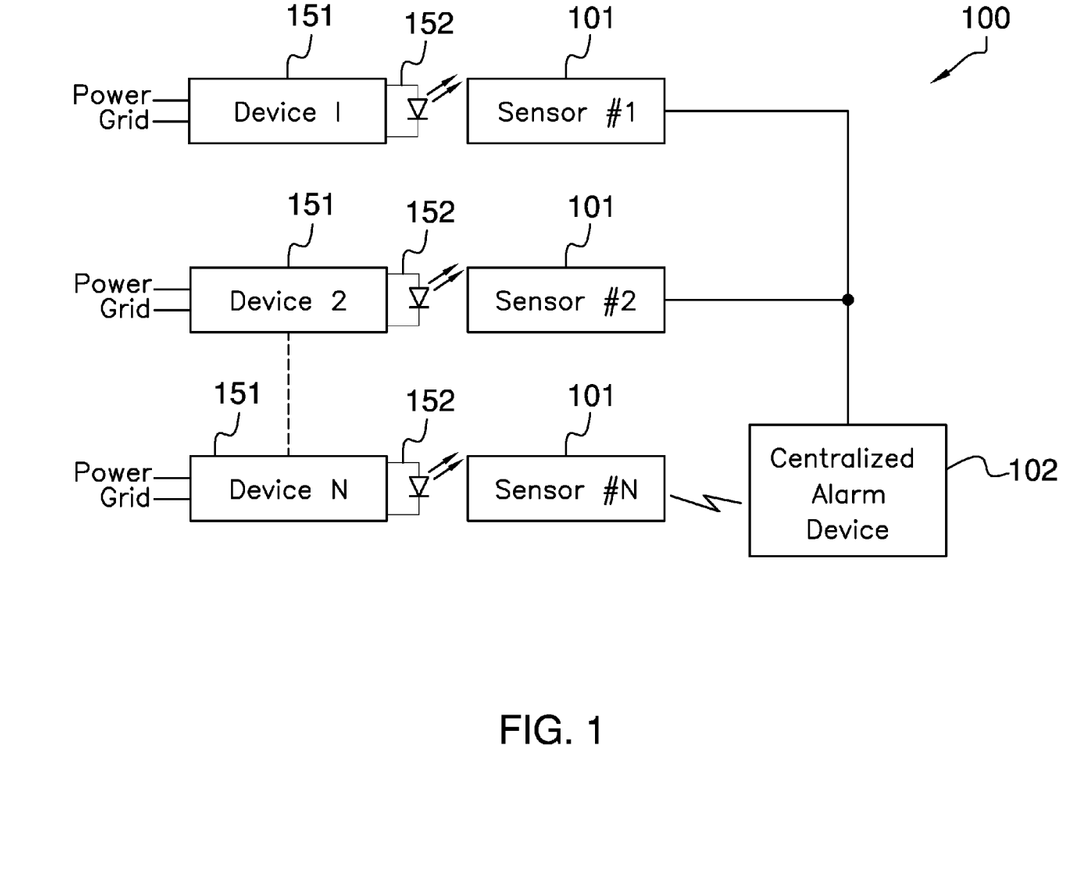
FIG. 1 is a block diagram of an embodiment of the disclosure.
Figure 2:
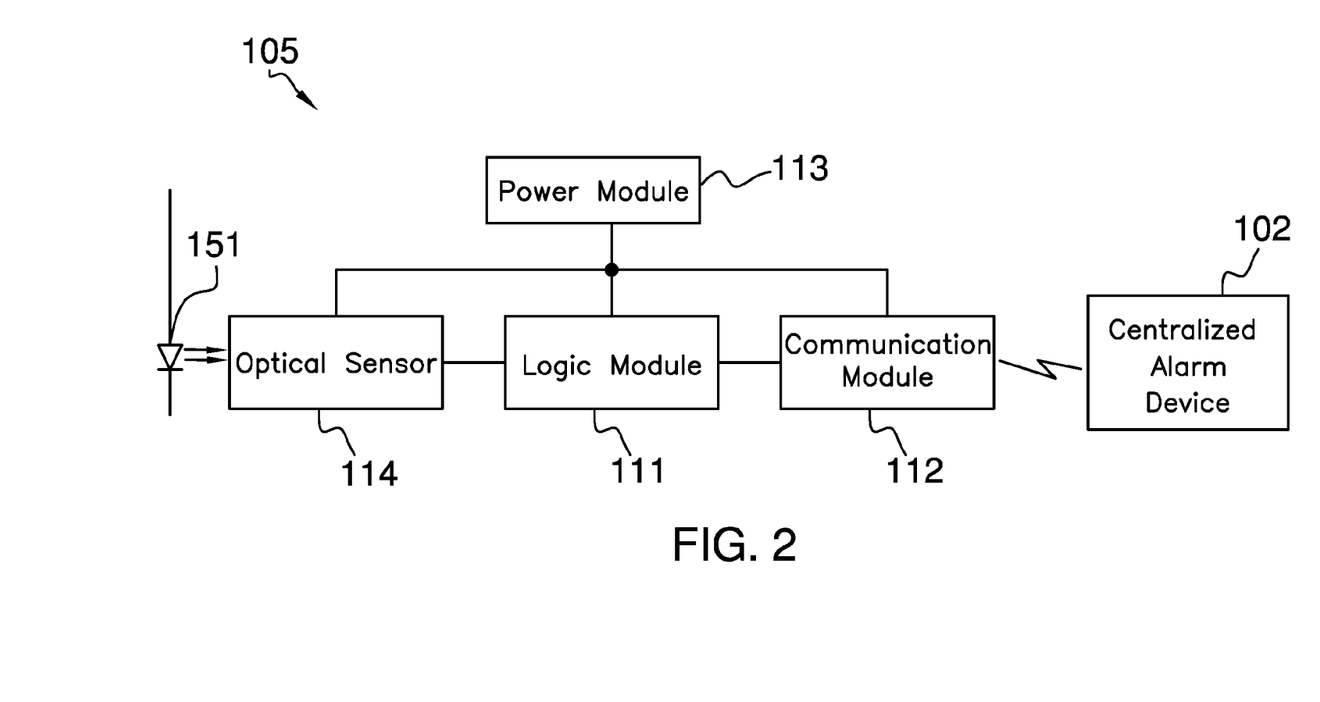
FIG. 2 is a block diagram view of a portion of an embodiment of the disclosure.

The first logic module 111 is a programmable device that is used to control the operation of each individual sensor 105. Depending on the specific design and the selected components, the first logic module 111 can be a separate component within the individual sensor 105 or the functions of the first logic module 111 can be incorporated into the first communication module 112, the first power module 113, or the optical sensor 114. The first communication module 112 is used to communicate the power indication light 152 status from the individual sensor 105 to the centralized alarm device 102. Depending on the design, the first communication module 112 can used for wired communication protocols or wireless communication protocols. Wireless communication protocols, such as 802.11 or Bluetooth, are preferred. The first power module 113 provides the electrical energy required to operate the first logic module 111, the first communication module 112, and the optical sensor 114. The first power module 113 can be adapted to use: batteries, electricity drawn from the national grid, or some combination thereof.

Figure 3:
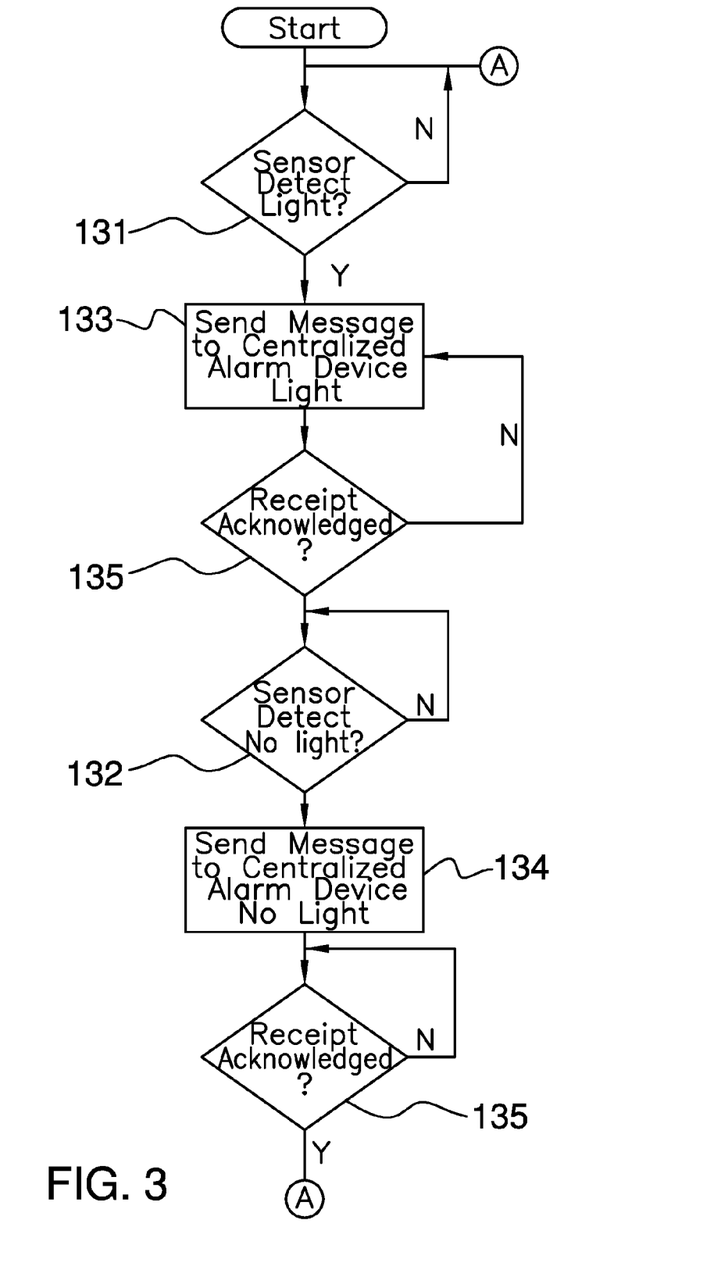
FIG. 3 is a flow chart view of a portion of an embodiment of the disclosure.

As most clearly shown in FIG. 3, each individual sensor 105 operates as described in this paragraph. The first logic module 111 monitors the optical sensor 114 for a change in the power status of the power indication light 152 from dark to light 131 or light to dark 132. When the first logic module 111 detects a power status change, the first logic module 111 sends either: a first message 133 through the first communication module 112 to the centralized alarm device 102 indicating that the status of the power indication light 152 has changed from dark to light 131; or, a second message 134 through the first communication module 112 to the centralized alarm device 102 indicating that the status of the power indication light 152 has changed from light to dark 132. The individual sensor 105 sends both the first message 133 and the second message 134 continuously until an acknowledgement message 135 from the centralized alarm device 102 is received via the individual sensor 105.

Figure 5:
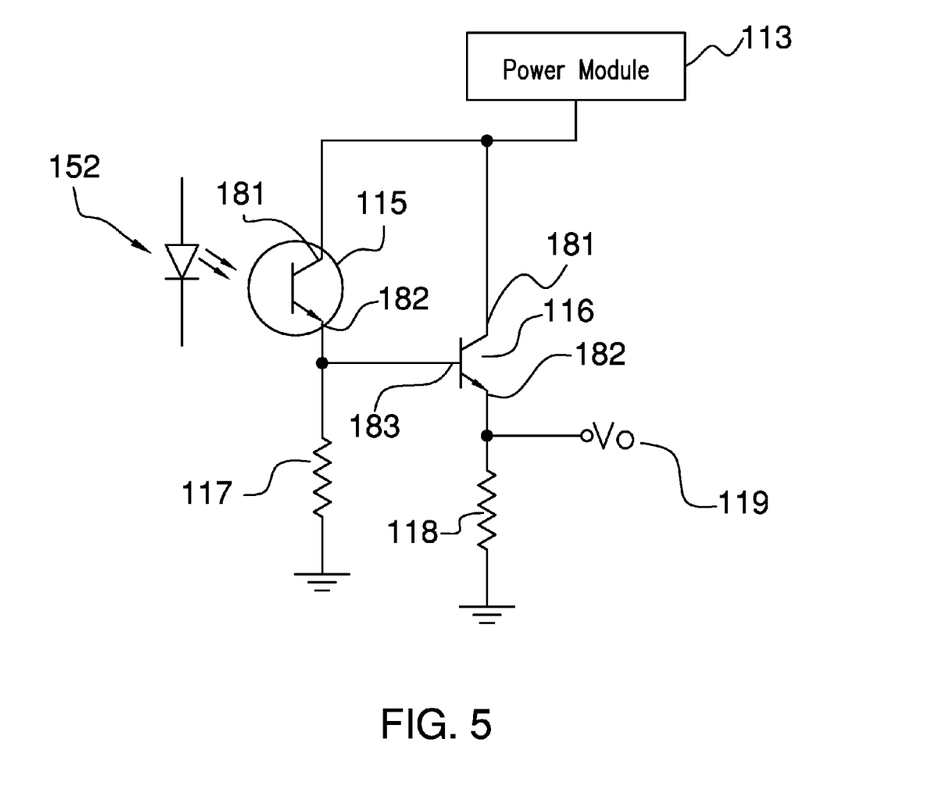
FIG. 5 is a schematic view of a portion of an embodiment of the disclosure.

As shown most clearly in FIG. 5, the optical sensor 114 further comprises a phototransistor 115, a transistor 116, a first pull down resistor 117, a second pull down resistor 118 and an output voltage (Vo) 119. The collector 181 lead of the phototransistor 115 and the collector 181 lead of the transistor 116 are connected to the first power module 113 which provides a supply voltage to the phototransistor 115 and the transistor 116. The emitter 182 lead of the phototransistor 115 is connected both to the base 183 lead of the transistor 116 and the first lead of the first pull down resistor 117. The second lead of the first pull down resistor 117 is connected to ground. The emitter 182 lead of the transistor 116 is connected to the first lead of the second pull down resistor 118. The second lead of the second pull down resistor 118 is connected to ground.

As shown most clearly in FIG. 5, the optical sensor 114 operates as follows: when the light from the power indication light 152 of the appliance 151 falls upon the phototransistor 115, the phototransistor 115 acts like a closed switch and allows electric current to flow from the power module 103 through the phototransistor 115 and through the first pull down resistor 117. The current flow through the first pull down resistor 117 creates a voltage across the first pull down resistor 117, which generates a current flow into the base 183 of the transistor 116. This flow of current into the base 183 of the transistor 116 causes the transistor 116 to act like a closed switch, which allows electric current to flow from the power module 103 through the transistor 116 and through the second pull down resistor 118. This current flow through the second pull down resistor 118 generates an output voltage (Vo) 119 that is measurable by the first logic module 111 to indicate that the power indication light 152 is illuminated.

When light fails to fall on the phototransistor 115, this causes the phototransistor 115 and the transistor 116 to act like open switches which causes the output voltage (Vo) 119 to fall to zero. The first logic module 111 interprets a zero output voltage (Vo) 119 to indicate that the power indication light 152 is not illuminated. In alternative embodiments of the disclosure, photoelectric devices other than phototransistors can be substituted for the phototransistor 115. Those skilled in the art will be readily able to adjust the circuit described in this paragraph to accommodate the substitution.

Figure 4:
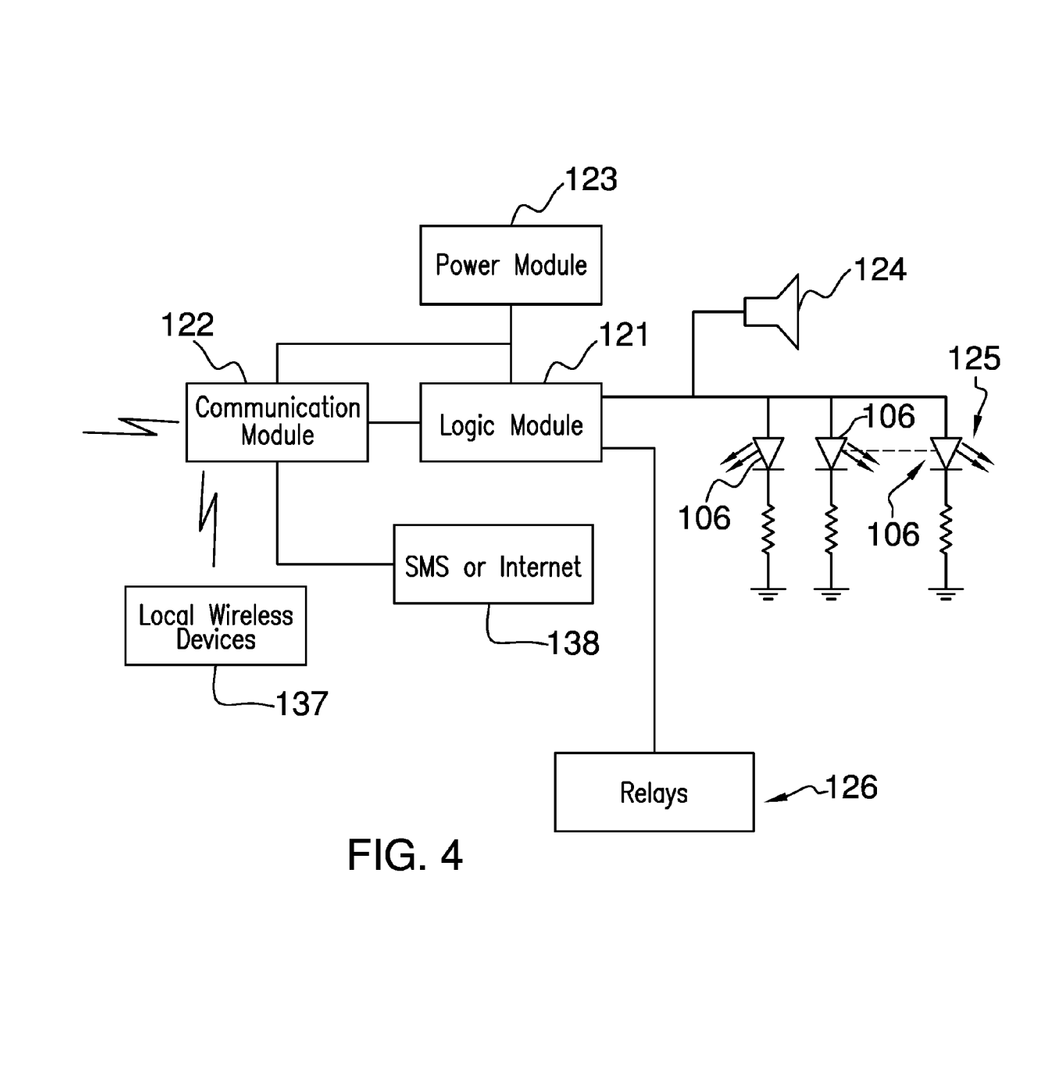
FIG. 4 is a block diagram view of a portion of an embodiment of the disclosure.

The centralized alarm device 102 monitors the one or more sensors 101 to determine which of the monitored appliances 151 are powered and which of the monitored appliances 151 are not powered. The centralized alarm device 102 further comprises a second logic module 121, a second communication module 122, a second power module 123, a buzzer 124, and a plurality of LEDs 125. The second logic module 121 is a programmable device that is used to control and operate the centralized alarm device 102. The second communications module 122 receives communications from the one or more sensors 101 and relays this information to the second logic module 121. In addition, the second logic module 121 uses the second communication module 122 to communicate alarm messages to local wireless devices 137 or to communicate electronic messages 138 via SMS over wireless phone networks or email over the internet. The second power module 123 provides the electrical power required for the operation of the second logic module 121, the second communication module 122, the buzzer 124, and the plurality of LEDs 125. The second logic module 121 operates the buzzer 124 when an audible alarm needs to be sounded.

The second power module 123 can be adapted to use: batteries, electricity drawn from the national grid, or some combination thereof. The plurality of LEDs 125 further comprises a collection of individual LEDs 106. The second logic module 121 operates the plurality of LEDs 125. Each individual LED 106 is assigned an appliance 151 selected from the one or more appliances 151 being monitored. When an individual sensor 105 indicates that the appliance 151 the individual sensor 105 is monitoring is powered on, the second logic module 121 illuminates the individual LED 106 that has been assigned to the individual sensor 105. The plurality of LEDs 125 provides a visual indication of the power status of each of the one or more appliances 151 being monitored.

The centralized alarm device 102 can further comprise a plurality of relays 126. The plurality of relays 126 further comprises a collection of individual relays 107. Each individual relay 107 is a switch that is controlled by the second logic module 121. The switch of each individual relay 107 is placed in series between the electrical power source of a monitored appliance 151 and the monitored appliance 151 selected from the one or more appliances 151. The second logic module 121 of the centralized alarm device 102 controls the signal that opens the switch of each individual relay 107, which disconnects the selected appliance 151 from the selected appliance's 151 power source.

In the first potential embodiment of the disclosure, each of the plurality of relays 126 are wired directly to the centralized alarm device 102 and are controlled directly by the second logic module 121. Techniques and methods to control relays using logic modules are well known and documented in the art. In the second potential embodiment of the disclosure, each individual relay 107 is controlled via an individual sensor 105 selected from the one or more sensors 101. In this scenario, the second logic module 121 indirectly controls the operation of the plurality of relays 126 by sending a message to the first logic module 111 of the appropriate individual sensor 105 selected from the one or more sensors 101 to open the individual relay 107 associated with the selected individual sensor 105. In this case, the individual relay 107 is controlled directly by the first logic module 111 under the supervision of the second logic module 121.

Figure 6:
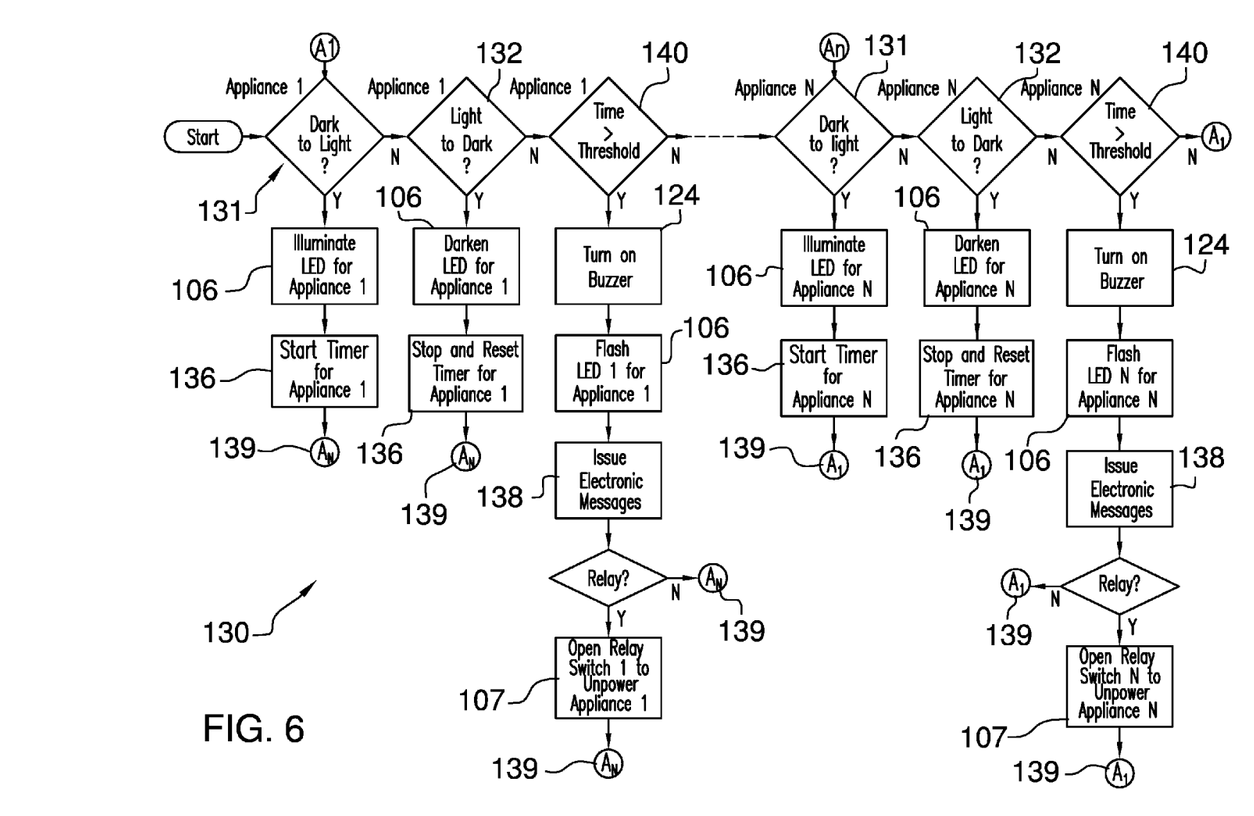
FIG. 6 is a flowchart view of a portion of an embodiment of the disclosure.

The operation of the centralized alarm device 102 is described in this paragraph and the following 6 paragraphs. The second logic module 121 of the centralized alarm device 102 goes through a master loop that monitors each of the one or more appliances 151 that is monitored by an individual sensor 105 selected from the one or more sensor 101. Once each of the one or more appliances 151 have been monitored once, the second logic module 121 repeats the master loop for each of the one or more appliances 151.

As most clearly shown in FIG. 6, for each appliance 151 selected from the one or more appliances 151, the second logic module 121 will perform the functions described in the next 5 paragraphs.

The second logic module 121 will check to see if the individual sensor 105 has sent the first message 133 indicating the monitored power indication light 152 has gone from dark to light 131. If the monitored power indication light 152 has gone from dark to light 131, the second logic module 121 illuminates the individual LED 106 selected from the plurality of LEDs 125 that is assigned to the individual sensor 105 being monitored. Next, the second logic module 121 starts a software timer 136 that is assigned to the individual sensor 105 being monitored. The second logic module 121 then proceeds to the next 139 appliance 151 in queue for the master loop 130.

If the second logic module 121 determines that the individual sensor 105 did not send a message indicating that the monitored power indication light 152 has gone from dark to light 131, the second logic module 121 will check to see if the individual sensor 105 has sent the second message 134 indicating the monitored power indication light 152 has gone from light to dark 132. If the monitored power indication light 152 has gone from light to dark 132, the second logic module 121 turns off the individual LED 106 selected from the plurality of LEDs 125 that is assigned to the individual sensor 105 being monitored. Next the second logic module 121 will stop the software timer 136 that is assigned to the individual sensor 105 being monitored and will reset the software timer 136. The second logic module 121 then proceeds to the next 139 appliance 151 in queue for the master loop 130.

If the second logic module 121 determines that the individual sensor 105 did not send a message indicating that the monitored power indication light 152 has gone from light to dark 132, the second logic module 121 will check the software timer 136 to determine if the elapsed time has exceeded a threshold value 140 that is set for the appliance 151. The threshold value 140 is a user-defined value that sets the maximum amount of time that the user wants power to be supplied to the appliance 151. If the second logic module 121 determines that the time on the software timer 136 is greater than the threshold value 140, the second logic module 121 turns on the buzzer 124 to generate an audible alarm and flashes the individual LED 106 selected from the plurality of LEDs 125 that is assigned to the individual sensor 105 being monitored. The second logic module 121 will also issue electronic messages 138 via Bluetooth, SMS, or the internet as previously determined by the user.

If the invention 100 is configured to use the plurality of relays 126, the second logic module 121 will issue the appropriate instructions to open the relay associated with the individual sensor 105 being monitored. The second logic module 121 then proceeds to the next 139 appliance 151 in queue for the master loop 130. If the invention 100 is not configured to use the plurality of relays 126, the second logic module 121 simply proceeds to the next 139 appliance 151 in queue for the master loop 130.

Methods and techniques to turn on and off a buzzer and to flash an LED are well known and documented in the software and microcontroller arts. Methods and techniques to query the user to set the amount of time used for the threshold value 140 are well known and documented in the software and microcontroller arts.

To use the invention 100, the threshold value 140 for each appliance 151 selected from the one or more appliances 151 is provided to the centralized alarm device 102. The optical sensor 114 of an individual sensor 105 is placed on top of the power indication light 152 of the appliance 151 that the individual sensor 105 is assigned to monitor. In the first potential embodiment of the disclosure and the second potential embodiment of the disclosure, the optical sensor 114 is affixed to the power indication light 152 using an adhesive. An opaque adhesive or an adhesive tape with an opaque backing that prevents stray light from reaching the optical sensor 114 is preferred. By powering up each individual sensor 105 selected from the one or more sensors 101 and then powering up the centralized alarm device 102, the invention 100 will begin operation.

In the first potential embodiment of the disclosure and the second potential embodiment of the disclosure: a readily and commercially available Arduino microcontroller is used for the first logic module 111; a readily and commercially available Arduino microcontroller is used for the second logic module 121; a readily and commercially available Bluetooth shield is used for the first communication module 112; a readily and commercially available Bluetooth shield and a readily and commercially available Wi-Fi module is used to perform the functions of the second communication module 122; the phototransistor 115, the transistor 116, the resistors, buzzers, LEDs, and relays discussed in this disclosure are readily and commercially available. Readily and commercially available housing designed for Arduino microcontrollers and shields are used to house each of the one or more sensors 101 and the centralized alarm device 102.

The following definitions were used in this disclosure:

Appliance: As used in this disclosure, an appliance is an externally powered device or instrument intended for household use.

Battery: As used in this disclosure, a battery is a container consisting of one or more cells, in which chemical energy is converted into electricity and used as a source of power.

Buzzer: As used in this disclosure, a buzzer is two lead electrical device that generates an audible sound when voltage is applied to the two leads.

LED: As used in this disclosure, an LED is an acronym for a light emitting diode. A light emitting diode is a 2 lead semiconductor that is a light source.

Logic Module: As used in this disclosure, a logic module is a programmable device that accepts digital and analog inputs, processes the digital and analog inputs according to previously stored instruction and to provide the results of these instructions as digital or analog outputs.

Photoelectric: As used in this definition, photoelectric is an adjective used to describe an electronic component in which the performance of the electronic component is modified by light. Typical photoelectric devices include, but are not limited to, photoelectric transistors, photoelectric diodes, and photoelectric resistors.

Relay: As used in this disclosure, a relay is an automatic electromagnetic or electromechanical device that reacts to changes in voltage or current by opening or closing a switch in an electric circuit. Note: Though transistors can be configured to perform switching functions, transistors used for switching functions are handled separately in this disclosure and are explicitly excluded from this definition.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A power state monitor comprising:
   one or more individual sensors and a centralized alarm device;
   wherein the power state monitor is adapted for use with one or more appliances;
   wherein each individual sensor is adapted to detect a light generated by a power indication light of an appliance selected from the one or more appliances;
   wherein each individual sensor communicates with the centralized alarm device;
   wherein each individual sensor communicates a first message when the power indication light of an appliance selected from the one or more appliances changes from dark to light;
   wherein each individual sensor communicates a second message when the power indication light of an appliance selected from the one or more appliances changes from light to dark;
   wherein the centralized alarm device monitors an elapsed time since a receipt of the first message for each individual sensor;
   wherein when the centralized alarm device determines that the elapsed time since the receipt of the first message from an individual sensor is greater than a previously determined threshold value, the centralized alarm generates a visual alarm, and an audible alarm.

2. The power state monitor according to claim 1 wherein each individual sensor further comprises a first logic module; wherein the first logic module is a programmable device that is used to control a operation of each individual sensor.

3. The power state monitor according to claim 2 wherein each individual sensor further comprises a first communication module; wherein the first communication module communicates the first message and the second message to the centralized alarm device.

4. The power state monitor according to claim 3 wherein each individual sensor comprises an optical sensor.

5. The power state monitor according to claim 4 wherein the optical sensor is a photoelectric device;
   wherein the first logic module monitors the optical sensor for a change in a status of the power indication light from dark to light;
   wherein the first logic module monitors the optical sensor for a change in the status of the power indication light from light to dark;
   wherein when the first logic module detects a power status change from dark to light the first logic module sends a first message through the first communication module to the centralized alarm device;
   wherein when the first logic module detects a power status change from light to dark the first logic module sends a second message through the first communication module to the centralized alarm device.

6. The power state monitor according to claim 5 wherein the centralized alarm device further comprises a second logic module wherein the second logic module is a programmable device that is used to control the operation of the centralized alarm device.

7. The power state monitor according to claim 6 wherein the centralized alarm device further comprises a second communication module;
   wherein the second communication module receives communications from the one or more sensors and relays this information to the second logic module;
   wherein the second communication module communicates alarm messages to local wireless devices;
   wherein the second communication module communicates alarm messages in a form of electronic messages sent via short message service (hereinafter SMS) over wireless phone network;
   wherein the second communication module communicates alarm messages in the form of electronic messages sent via email over the internet.

8. The power state monitor according to claim 7 wherein the centralized alarm device further comprises a buzzer and a plurality of light emitting diodes (hereinafter LEDs);
   wherein the second logic module uses the buzzer to generate an audible alarm;
   wherein the second logic module uses the plurality of LEDs to generate a visible alarm.

9. The power state monitor according to claim 8 wherein the centralized alarm device further comprises a plurality of individual relays.

10. The power state monitor according to claim 9 wherein the switch of each individual relay is placed in series between an electrical power source of a monitored appliance and the monitored appliance.

11. The power state monitor according to claim 10 wherein the second logic module of the centralized alarm device controls the signals that operates the switch of each individual relay.

12. The power state monitor according to claim 11 wherein the each of the plurality of relays are wired directly to the centralized alarm device.

13. The power state monitor according to claim 12 wherein the each individual relay is wired to an individual sensor and is controlled wirelessly by the second logic module.

14. The power state monitor according to claim 11 wherein the optical sensor further comprises a phototransistor, a transistor, a first pull down resistor, a second pull down resistor and an output voltage.

15. The power state monitor according to claim 1 wherein each individual sensor further comprises a first logic module wherein the first logic module is a programmable device that is used to control an operation of each individual sensor;
wherein each individual sensor further comprises a first communication module wherein the first communication module communicates the first message and the second message to the centralized alarm device;
wherein each individual sensor comprises an optical sensor;
wherein the optical sensor is a photoelectric device;
wherein the first logic module monitors the optical sensor for a change in the status of the power indication light from dark to light;
wherein the first logic module monitors the optical sensor for a change in the status of the power indication light from light to dark;
wherein when the first logic module detects a power status change from dark to light the first logic module sends a first message through the first communication module to the centralized alarm device;
wherein when the first logic module detects a power status change from light to dark the first logic module sends a second message through the first communication module to the centralized alarm device;
wherein the centralized alarm device further comprises a second logic module wherein the second logic module is a programmable device that is used to control the operation of the centralized alarm device.

16. The power state monitor according to claim 15 wherein the centralized alarm device further comprises a second communication module;
wherein the second communication module receives communications from the one or more sensors and relays this information to the second logic module;
wherein the second communication module communicates alarm messages to local wireless devices;
wherein the second communication module communicates alarm messages in the form of electronic messages sent via SMS over wireless phone network;
wherein the second communication module communicates alarm messages in the form of electronic messages sent via email over the internet;
wherein the centralized alarm device goes through a master loop that monitors each of the one or more appliances that is monitored by an individual sensor;
wherein when each of the one or more appliances have been monitored once, the second logic module repeats the master loop for each of the one or more appliances;
wherein the second logic module will check to see if each individual sensor has sent the first message;
wherein if the first message has been received by the second logic module then the second logic module illuminates the individual LED selected from the plurality of LEDs that is assigned to the individual sensor being monitored;
wherein if the first message has been received by the second logic module, the second logic module starts a software timer and proceeds to the next appliance in queue for the master loop;
wherein if the second message has been received by the second logic module, the second logic module turns off the individual LED selected from the plurality of LEDs that is assigned to the individual sensor being monitored;
wherein if the second message has been received by the second logic module, the second logic module stops and resets the software timer that is assigned to the individual sensor being monitored and proceeds to the next appliance in queue for the master loop;
wherein if the elapsed time has exceeded the threshold value that is set for the appliance the second logic module will issue electronic messages indicating an alarm and proceeds to the next appliance in queue for the master loop.

17. The power state monitor according to claim 16 wherein the centralized alarm device further comprises a buzzer and a plurality of LEDs;
wherein if the elapsed time has exceeded the threshold value that is set for the appliance the second logic module will generate an audible alarm using the buzzer;
wherein if the elapsed time has exceeded the threshold value that is set for the appliance the second logic module will flash the individual LED selected from the plurality of LEDs that is assigned to the individual sensor being monitored and proceeds to the next appliance in queue for the master loop.

18. The power state monitor according to claim 17 wherein the centralized alarm device further comprises a plurality of individual relays;
wherein the switch of each individual relay is placed in series between the electrical power source of a monitored appliance and the monitored appliance;
wherein the second logic module of the centralized alarm device controls the signals that operates the switch of each individual relay.

19. The power state monitor according to claim 18 wherein the optical sensor further comprises a phototransistor, a transistor, a first pull down resistor, a second pull down resistor and an output voltage.

20. The power state monitor according to claim 19 wherein each individual sensor further comprises a first power module;
wherein the collector of the phototransistor is connected to the first power module;
wherein the collector of the transistor is connected to the first power module;
wherein the emitter of the phototransistor is connected to the base of the transistor;
wherein the emitter of the phototransistor is connected to a first pull down resistor;
wherein the emitter of the transistor is connected to a second pull down resistor.

* * * * *